United States Patent
Drake et al.

(10) Patent No.: US 9,514,287 B2
(45) Date of Patent: Dec. 6, 2016

(54) AUTOMATED DEVICE AUTHORIZATON AND DEAUTHORIZATION

(71) Applicant: Disney Enterprises, Inc., Burbank, CA (US)

(72) Inventors: Edward Drake, Stevenson Ranch, CA (US); Michael Musick, South Pasadena, CA (US); Mark Arana, West Hills, CA (US); Andrew Wright, South Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/316,708

(22) Filed: Jun. 26, 2014

(65) Prior Publication Data

US 2015/0379243 A1    Dec. 31, 2015

(51) Int. Cl.
| | |
|---|---|
| *G06F 21/10* | (2013.01) |
| *H04L 29/08* | (2006.01) |
| *H04L 29/06* | (2006.01) |

(52) U.S. Cl.
CPC .............. *G06F 21/10* (2013.01); *H04L 63/102* (2013.01); *H04L 67/18* (2013.01)

(58) Field of Classification Search
CPC ...................................................... G06F 21/10
USPC ......................................................... 726/28
See application file for complete search history.

(56) References Cited

U.S. PATENT DOCUMENTS

| | | | | |
|---|---|---|---|---|
| 6,430,537 | B1 * | 8/2002 | Tedesco et al. ............... | 705/7.22 |
| 6,782,550 | B1 * | 8/2004 | Cao .................................. | 725/39 |
| 2002/0174354 | A1 * | 11/2002 | Bel et al. ....................... | 713/193 |
| 2004/0181591 | A1 * | 9/2004 | Yu et al. ........................ | 709/217 |
| 2007/0060355 | A1 * | 3/2007 | Amaitis et al. .................. | 463/40 |
| 2008/0271158 | A1 * | 10/2008 | Kamperman ................... | 726/27 |
| 2009/0077652 | A1 * | 3/2009 | Choi et al. ...................... | 726/16 |
| 2009/0286544 | A1 * | 11/2009 | Huber et al. .................. | 455/450 |
| 2010/0138900 | A1 * | 6/2010 | Peterka et al. .................... | 726/4 |
| 2013/0124859 | A1 * | 5/2013 | Pestoni et al. ................ | 713/163 |
| 2013/0253960 | A1 * | 9/2013 | Woods et al. ..................... | 705/4 |
| 2014/0148123 | A1 * | 5/2014 | Raleigh et al. ............... | 455/406 |

\* cited by examiner

*Primary Examiner* — William Powers
(74) *Attorney, Agent, or Firm* — Patent Ingenuity, P.C.; Samuel K. Simpson (57) ABSTRACT

A process verifies, with a processor, a user account for content delivery with a rolling slot configuration. The rolling slot configuration has a maximum quantity of available slots for devices authorized to receive content. The rolling slot configuration has a plurality of ordered slots that are ordered based upon priority. The process receives a request for content from the user account at a device. The process automatically registers the device in an available slot of the rolling slot configuration based upon a determination of slot availability. The process authorizes the device to play content associated with a user entitlement. The process automatically deauthorizes the device to play the content based upon a deauthorization parameter being met. The process removes a registration of the device from the available slot. The process moves a registration of an additional device with a higher priority than the device to the available slot.

20 Claims, 6 Drawing Sheets

AUTOMATED DEVICE AUTHORIZATON AND DEAUTHORIZATION

BACKGROUND

1. Field

This disclosure generally relates to the field of media distribution.

2. General Background

Some current media distribution configurations provide for a secure digital rights management ("DRM") mechanism for users to access media, e.g., movies, applications, games, graphics, etc., from a variety of different computing devices, e.g., a personal computer ("PC"), laptop computer, tablet device, smartphone, etc. Such media distribution configurations associate a user account with permissible computing devices for media distribution. For example, a user may specify that a particular smartphone and a particular tablet device are associated with the user's movie streaming account so that the movie streaming service may stream movies to those particular devices.

Further, media content owners typically establish usage rules for user accounts that, among several things, limit the quantity of devices that may be associated with a user account. Accordingly, media content distributors utilizing the media distribution configurations have to abide by such usage rules and have been utilizing mechanisms that allow users to associate devices with a user account and also remove devices from the user account to comply with the usage rules. For example, media content distributers have developed graphical user interfaces, e.g., a webpage, to allow users to manually associate or disassociate a device from a user account.

Such user interfaces are often cumbersome for users to utilize. Further, current configurations require some form of manual user interaction in order to manage devices associated with a user account. As a result, many users may be prevented from utilizing content services or from receiving the maximum benefit from the content services.

SUMMARY

In one aspect, a process verifies, with a processor, a user account for content delivery with a rolling slot configuration. The rolling slot configuration has a maximum quantity of available slots for devices authorized to receive content. The rolling slot configuration has a plurality of ordered slots that are ordered based upon priority. Further, the process receives a request for content from the user account at a device. In addition, the process automatically registers the device in an available slot of the rolling slot configuration based upon a determination of slot availability. The process authorizes the device to play content associated with a user entitlement. Further, the process automatically deauthorizes the device to play the content based upon a deauthorization parameter being met. In addition, the process removes a registration of the device from the available slot. The process moves a registration of an additional device with a higher priority than the device to the available slot.

In another aspect, a computer program product comprises a computer readable storage device having a computer readable program stored thereon. The computer readable program while executing on a computer causes the computer to verify, with a processor, a user account for content delivery with a rolling slot configuration. The rolling slot configuration has a maximum quantity of available slots for devices authorized to receive content. The rolling slot configuration has a plurality of ordered slots that are ordered based upon priority. Further, the computer is caused to receive a request for content from the user account at a device. In addition, the process automatically registers the device in an available slot of the rolling slot configuration based upon a determination of slot availability. The computer is caused to authorize the device to play content associated with a user entitlement. Further, the computer is caused to automatically deauthorize the device to play the content based upon a deauthorization parameter being met. In addition, the computer is caused to remove a registration of the device from the available slot. The computer is caused to move a registration of an additional device with a higher priority than the device to the available slot.

In yet another aspect, a system comprises a processor that verifies a user account for content delivery with a rolling slot configuration, receives a request for content from the user account at a device, automatically registers the device in an available slot of the rolling slot configuration based upon a determination of slot availability, authorizes the device to play content associated with a user entitlement, automatically deauthorizes the device to play the content based upon a deauthorization parameter being met; removes a registration of the device from the available slot, and moves a registration of an additional device with a higher priority than the device to the available slot. The rolling slot configuration has a maximum quantity of available slots for devices authorized to receive content. The rolling slot configuration has a plurality of ordered slots that are ordered based upon priority.

BRIEF DESCRIPTION OF THE DRAWINGS

The above-mentioned features of the present disclosure will become more apparent with reference to the following description and accompanying drawings, wherein like reference numerals denote like elements and in which.

DETAILED DESCRIPTION

An automated device authorization and deauthorization process, computer program product, and system are provided to automatically manage user devices associated with a user account without manual user intervention. Although recent developments have allowed for capturing and storing a device identifier during the initial request by a user for content from a media content distributer, manual intervention by the user is still necessary after a maximum limit on the quantity of devices is reached. The user still has to manually disassociate devices via a media content distributor user interface to allow for a new device to be utilized. The automated device authorization and deauthorization process, computer program product, and system remove any need for the user to actively manage devices associated with a user account.

As the number and type of devices that may be associated with a user account to view secure media increases, the automated device authorization and deauthorization process, computer product, and system described herein makes it easier for users to manage the association of the devices with content distributors. Further, the automated device authorization and deauthorization process, computer product, and system remove the need for users to be aware of updates to usage policies, e.g., updates to the number of permissible devices. In contrast with having to read a Frequently Asked Questions ("FAQ") webpage to learn about changes to usage policies, or having to manually manage the addition and deletion of devices, the automated device authorization and deauthorization process, computer product, and system automatically monitor updates to usage policies and comply with such updates without requiring manual intervention by the user. If a particular parameter limit is reached, a user notification may be provided to obtain input from the user for determining device removal.

Figure 1:
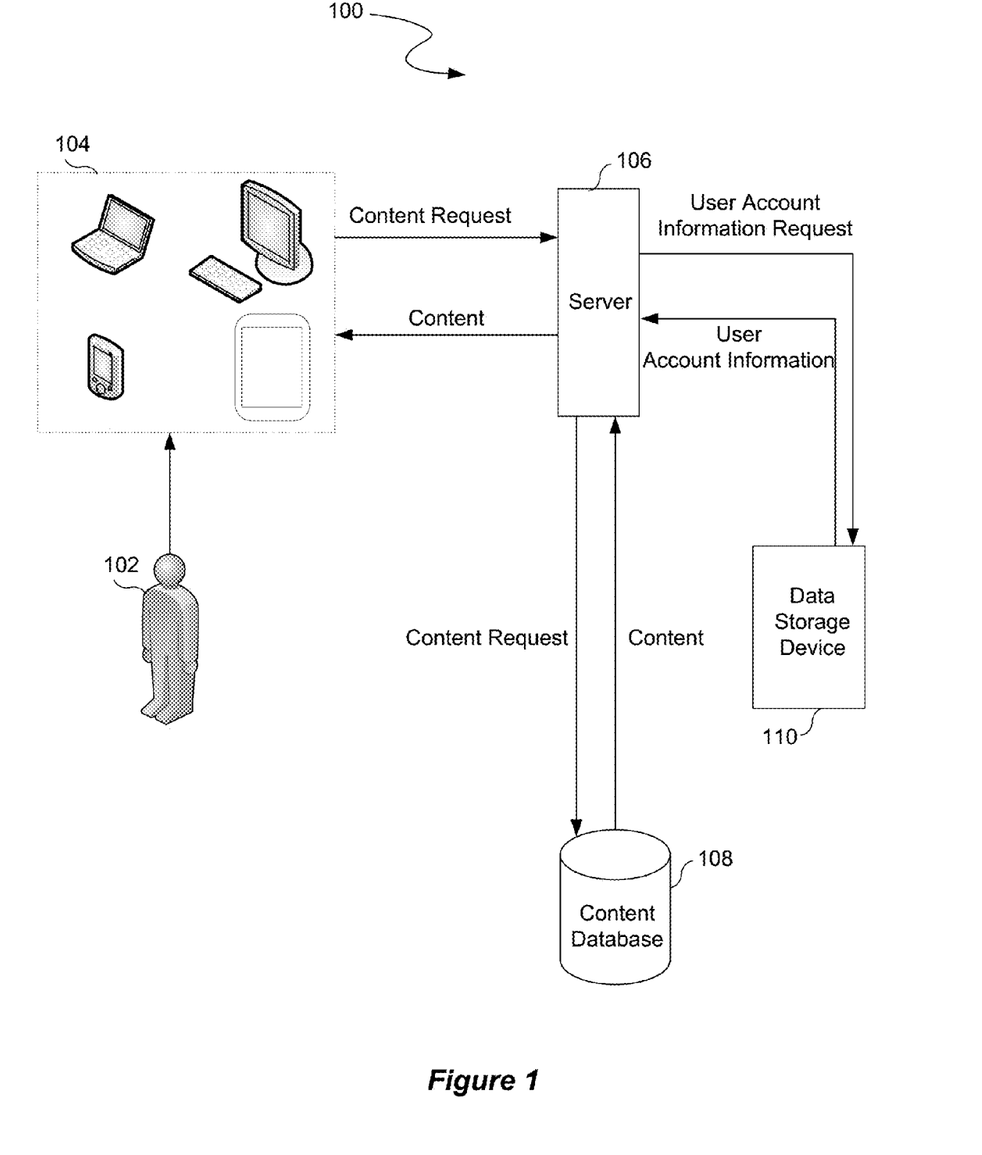
FIG. 1 illustrates a content delivery configuration.

FIG. 1 illustrates a content delivery configuration 100. The content delivery configuration 100 has a user 102 that utilizes a plurality of devices 104 to receive and playback content, e.g., movie streams, movie downloads, music streams, music downloads, games, applications, graphics, etc. Examples of the plurality of devices are computing devices such as a PC, laptop computer, smartphone, smart TV, tablet device, etc. Each of the plurality of devices 104 may request content from a server 106. As an example, the server may be maintained by a content distributor. The server 106 may search through a content database 108 to find the requested content and provide the content to a device 104.

Prior to providing the content to the device 104, the server 106 determines if the device is an authorized device to receive the content, and that the user account is authorized to view the content (has entitlements). In one aspect, the server 106 obtains user account information from a data storage device 110. The server 106 determines if the user has entitlements and if the device 104 is associated with a user account for the user 102. If the device 104 is already authorized for the user account, the server 106 proceeds to provide the content to the device 104 if the user has an entitlement to playback the content.

If the device 104 is not an authorized device, the server 106 automatically determines if a maximum quantity of devices associated with the user account as determined by the usage policy has been reached. If the maximum quantity of devices has not been reached, the server 106 automatically adds the device 104 as an authorized device to the user account without manual intervention from the user 102. The authorization data is stored on the data storage device 110.

Accordingly, the user 102 does not have to manually add the device 104. The server 106 recognizes that the device 104 used by the user 102 to login to the user account is a device 104 that has not been authorized yet and automatically registers the device 104 as an authorized device 104.

Figure 2:
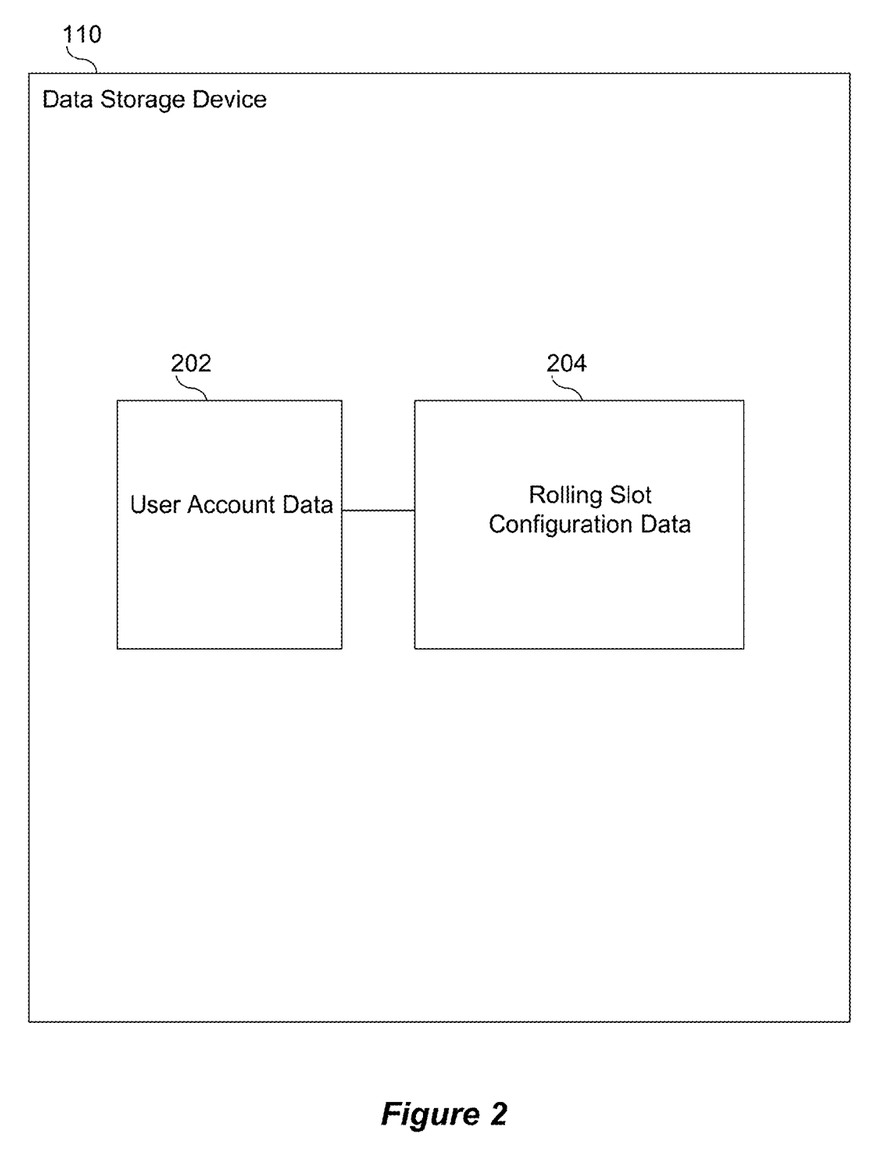
FIG. 2 illustrates the data that is stored on the data storage device.

FIG. 2 illustrates the data that is stored on the data storage device 110. The data storage device 110 stores user account data 202 and rolling slot configuration data 204. Each user account is associated with a rolling slot configuration that lists the current devices 104 that are authorized to receive and playback content. Devices 104 may be deauthorized from the rolling slot configuration based upon a deauthorization parameter being met. The deauthorization parameters may include a variety of parameters such as time based parameters, location based parameters, device based parameters, etc.

An example of a time based parameter is a content playback expiration parameter. For instance, video on demand ("VOD") content may require a particular playback period. Upon completion of the playback period, the device 104 is deauthorized as the deauthorization parameter condition is met. Another example of a time based parameter is an idle time device parameter. If the device 104 has been idle for a particular period of time without usage, the deauthorization parameter condition is met.

Further, an example of a location based parameter is a condition of a device 104 entering, being present within, exiting, or being present outside of a particular geographic location. For example, a device 104 may be authorized to playback content within a particular country or territory. The device 104 may then be deauthorized if the user 102 takes the device 104 outside of that country or territory.

An example of a device based parameter is a technology obsolescence parameter. If a device 104 is not utilizing a current version of hardware or software, e.g., an operating system, the device 104 may be deauthorized. As another example, the user 102 may customize a user preference for device priority. For instance, the user 102 may establish that a tablet device has priority over a smartphone for the playback of content. As yet another example, device security may be utilized to deauthorize a device 104. If a security issue is detected at a particular device 104, e.g., piracy of content, malware, etc., the device 104 may be deauthorized.

In one aspect, the server 106 monitors any updates to the usage policy and updates the rolling slot configuration data accordingly. For example, the server 106 may monitor a change to the maximum quantity of devices permitted. The server 106 may then update the rolling slot configuration based upon the update. Therefore, the server 106 automatically monitors the usage rules, ensures compliance with the usage rules, and updates the usage rules for further compliance without any need for manual intervention from the user 102.

Figure 3A:
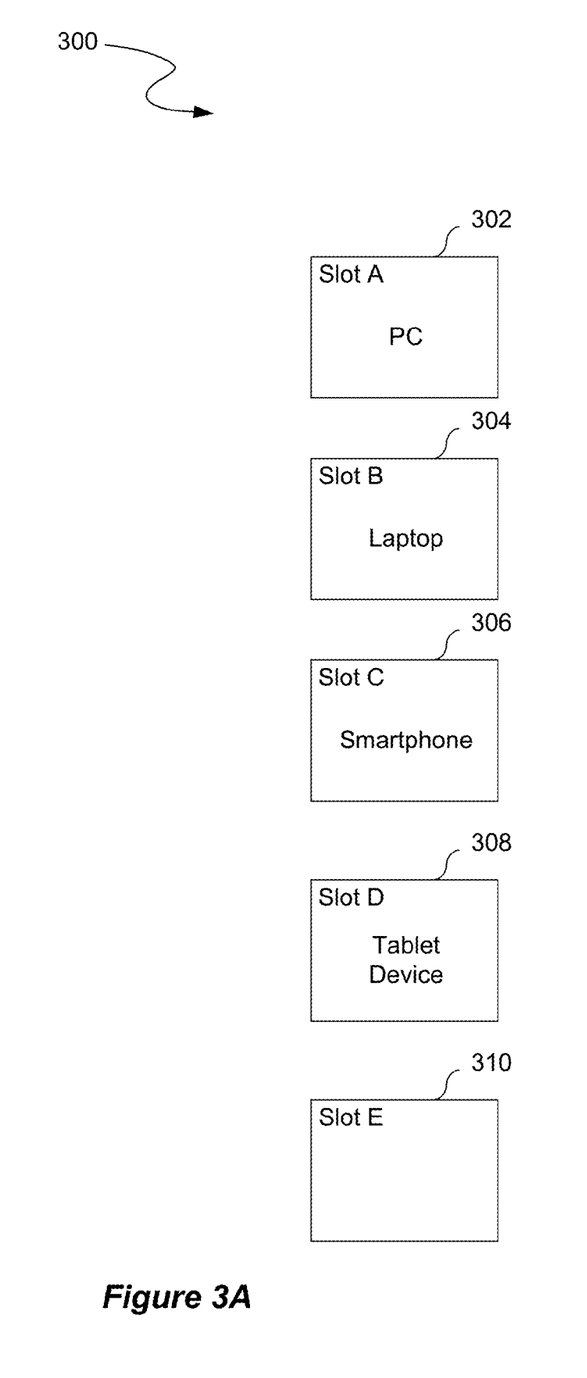
FIG. 3A illustrates the rolling slot configuration having five slots: slot A, slot B, slot C, slot D, and slot E.
Figure 3B:
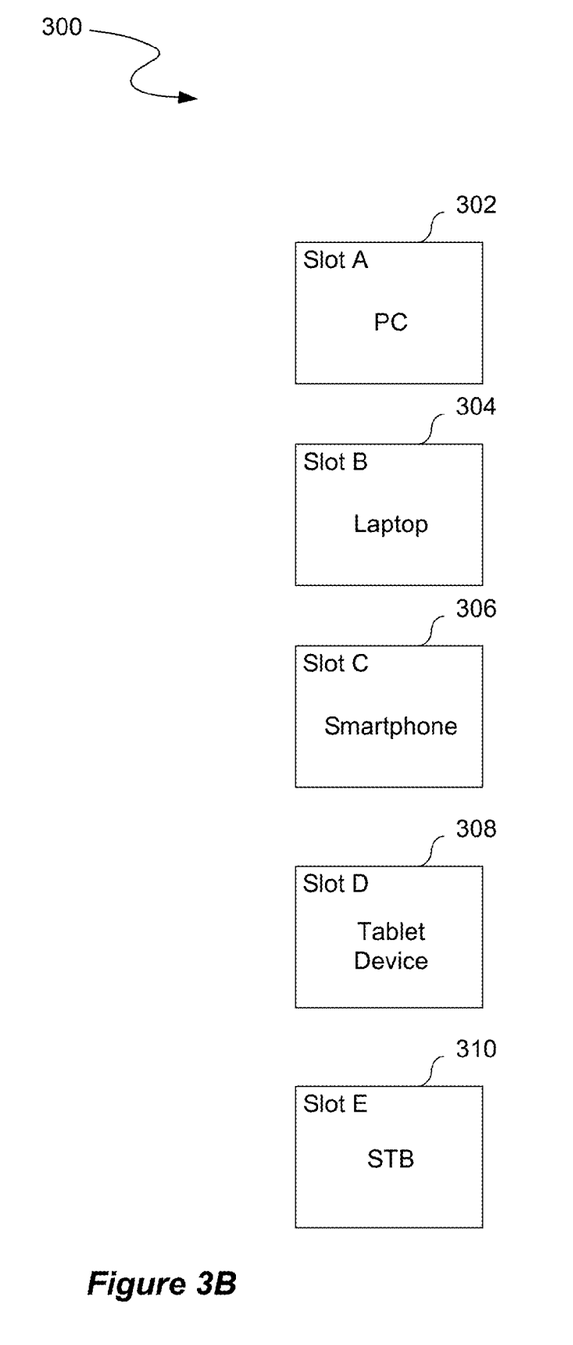
FIG. 3B illustrates the set top box ("STB") being registered at slot E.
Figure 3C:
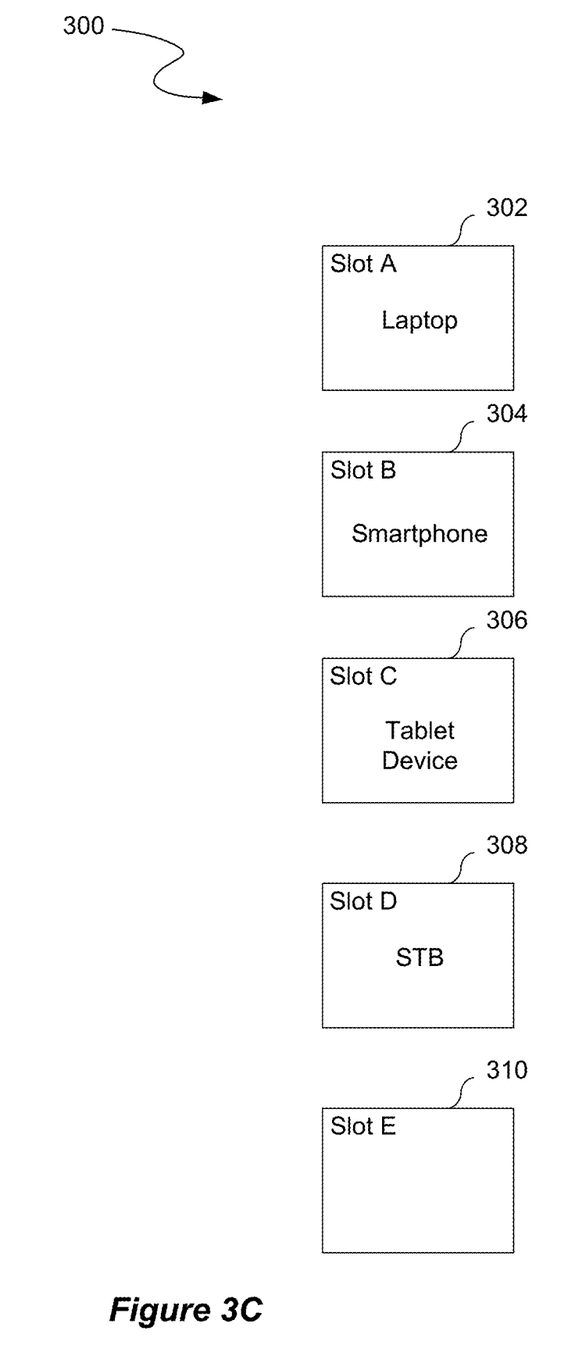
FIG. 3C illustrates an example of devices being reordered in the rolling slot configuration after a device is deauthorized based upon a deauthorization parameter being met.

FIGS. 3A-3C illustrate an example of a rolling slot configuration 300 that is determined from the rolling slot configuration data 204 illustrated in FIG. 2. The example utilizes a rolling slot configuration 300 that has a maximum quantity of devices as five devices 104 for ease of illustration. Varying maximum quantities of devices 104 may be utilized.

FIG. 3A illustrates the rolling slot configuration 300 having five slots: slot A 302, slot B 304, slot C 306, slot D 308, and slot E 310. In one aspect, each slot is ordered according to a priority. For example, the rolling slot configuration 300 is illustrated as providing the highest priorities to the most recently filled slots. The slots are labeled with identifiers based upon those priorities, e.g., slot E 310 has the highest priority, whereas slot A 302 has the lowest priority.

The devices 104 illustrated in FIG. 1 are illustrated in FIG. 3A as already being authorized, e.g., a PC is registered at slot A 302, a laptop is registered at slot B 304, a smartphone 306 is registered at slot C 306, and a tablet device is registered at slot D 308. Slot E 310 is illustrated as empty since that slot is available.

The user 102 may want to playback content on another device 104 such as a Set-top box (STB). Accordingly, the user may login to the user account from the STB. The server 106 illustrated in FIG. 1 determines that the STB has not been authorized. Further, the server 106 determines that slot E 310 is available. Therefore, the server 106 automatically adds the STB to Slot E 310 and authorizes the STB to playback content for which the user 102 has entitlements. FIG. 3B illustrates the STB being registered at slot E 310.

After the maximum quantity of devices is reached as illustrated in FIG. 3B, the user 102 may not add any additional devices unless an authorized device is automatically deauthorized by the server 106 based upon a deauthorization parameter being met or the user 102 manually deauthorizes a device 104. In one aspect, a notification is electronically sent to the user 102 that the maximum quantity of devices 104 has been reached so that the user 102 may manually change devices.

FIG. 3C illustrates an example of devices being reordered in the rolling slot configuration 300 after a device is deauthorized based upon a deauthorization parameter being met. For instance, the PC that was registered at slot A 302 as illustrated in FIG. 3B is deauthorized because a deauthorization parameter has been met, e.g., a determination of an obsolete operating system. Therefore, the registration of the PC at slot A 302 is removed. As the laptop was more recently added to the rolling slot configuration than the PC, the laptop had a higher priority. Accordingly, the laptop registration is moved from slot B 304 to slot A 302. Similarly, the smartphone registration is moved from slot C 306 to slot B 304, the tablet device registration is moved from slot D 308 to slot C 306, and the STB registration is moved from slot E 310 to slot D 308.

If the smartphone had the obsolete operating system instead of the PC, the smartphone registration would be removed from slot C 306. The registrations with lower priority than the smartphone, e.g., the PC registration at slot A 302 and the laptop registration at slot B 304, would remain in their respective slots. The registrations with higher priority than the smartphone, e.g., the tablet device registration at slot D 308 and the STB registration at slot E 310, would be moved to lower priority slots. For example, the tablet device registration would be moved from slot D 308 to slot C 306. Further, the STB registration would be moved from slot E 310 to slot D 308.

A variety of other priority configurations may be utilized other than most recently added devices having the higher priority. For example, the most recently added device may be the lower priority. Further, factors other than or in addition to time may be utilized to determine priority.

Figure 4:
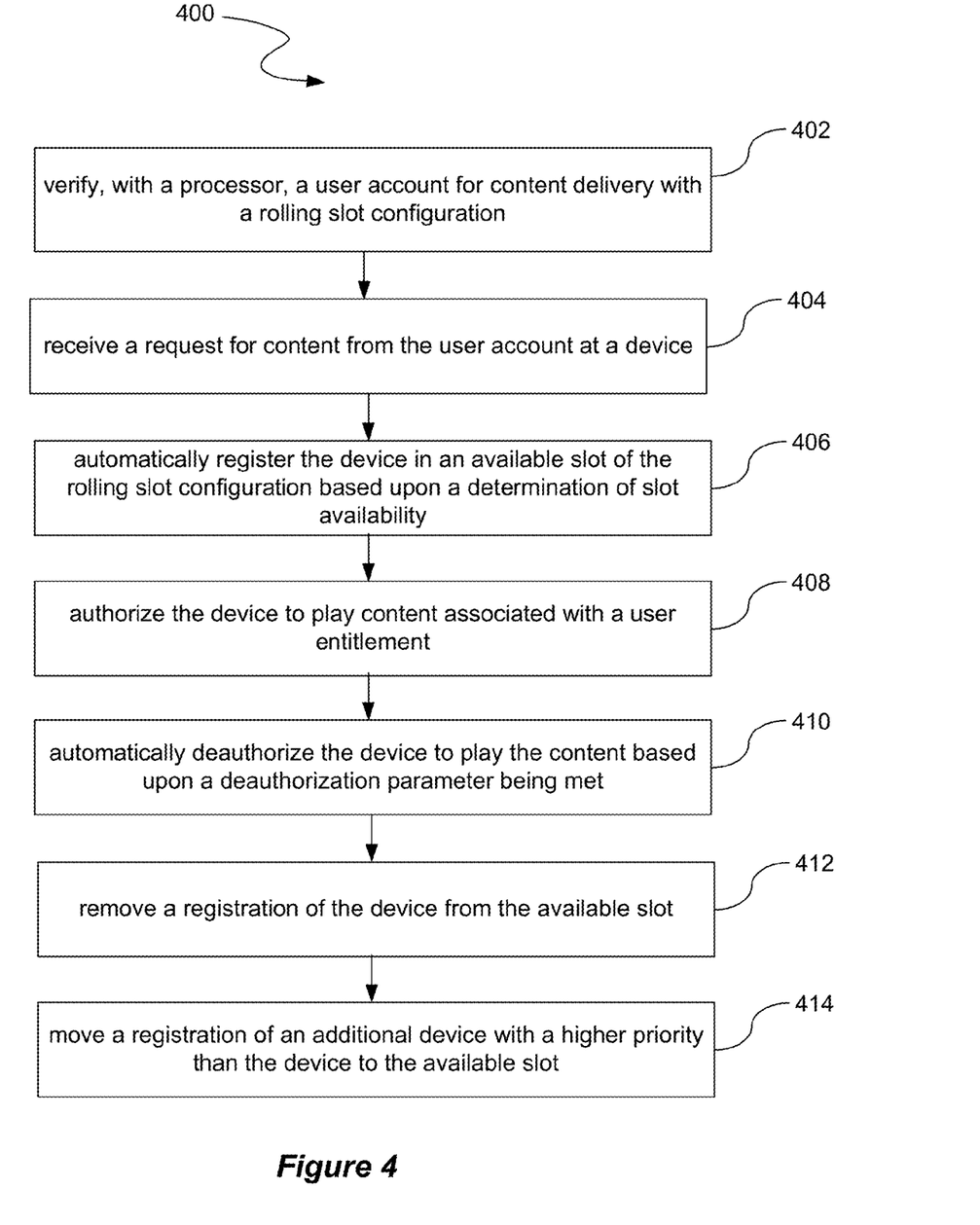
FIG. 4 illustrates a process that may be utilized to authorize and deauthorize devices.

FIG. 4 illustrates a process 400 that may be utilized to authorize and deauthorize devices. At a process block 402, the process 400 verifies, with a processor, a user account for content delivery with a rolling slot configuration. The rolling slot configuration has a maximum quantity of available slots for devices authorized to receive content. The rolling slot configuration has a plurality of ordered slots that are ordered based upon priority. Further, at a process block 404, the process 400 receives a request for content from the user account at a device. In addition, at a process block 406, the process 400 automatically registers the device in an available slot of the rolling slot configuration based upon a determination of slot availability. In one aspect, the registration is performed via a network call, e.g., http, radio frequency ("RF"), wireless protocol, etc., from the device 104 to the server 106 illustrated in FIG. 1. In another aspect, the registration is performed via a communication between the device 104 and a STB, e.g., the STB is tapped with the device 104 to register the device 104 with an account that is registered on the STB. A variety of communication protocols, e.g., wired or wireless communication protocols, may be utilized to perform the registration process. At a process block 408, the process 400 authorizes the device to play content associated with a user entitlement. Further, at a process block 410, the process 400 automatically deauthorizes the device to play the content based upon a deauthorization parameter being met. In addition, at a process block 412, the process 400 removes a registration of the device from the available slot. At a process block 414, the process 400 moves a registration of an additional device with a higher priority than the device to the available slot.

In another aspect, limits may be placed on issued DRM licenses associated with content that has been downloaded. Such limits prevent the situation where a device is authorized for a brief period of time to download authorized content, disconnected, and eventually deauthorized. By having the limits, downloaded content expires and is then unplayable when the license expires.

In yet another aspect, a total device quantity limit may be defined. Such total device quantity limit may be based on a variety of factors such as time or quantity of user accounts. For example, a predefined quantity of devices may be established for a time period such as one year. The server 106 may only allow devices 104 to be added, removed, and/or changed in compliance with the predefined quantity for the predefined time period. As another example, the predefined quantity may be established for a plurality of user accounts. For instance, a plurality of user accounts that are part of the same content delivery subscription plan may be limited by the total predefined quantity of devices. As yet another example, the total device quantity limit may be based on time and a plurality of user accounts, e.g., a predefined quantity of devices limit for a plurality of user accounts within a predefined time period.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:
1. A method comprising:
verifying, with a processor, a user account for content delivery with a rolling slot configuration, the rolling slot configuration having a maximum quantity of available slots for devices authorized to receive content, the rolling slot configuration having a plurality of ordered slots that are ordered from lowest to highest based upon priority, wherein the priority determines maintenance of the devices in the rolling slot configuration;

receiving a request for content from the user account at a device;

automatically registering the device in an available slot of the rolling slot configuration based upon a determination of slot availability, the available slot having a higher priority than at least a portion of a remainder of the plurality of ordered slots associated with previously assigned devices;

automatically assigning the device a first priority that is based on a position of the available slot in the rolling slot configuration;

authorizing the device to play content associated with a user entitlement;

automatically deauthorizing the device to play the content if the maximum quantity of available slots is filled and a deauthorization parameter is met for the device, wherein the device is deauthorized if one or more additional deauthorization parameters are met for one or more additional devices in the rolling slot configuration and the first priority has a lower priority than corresponding priorities of the one or more additional devices;

removing a registration of the device from the available slot after the deauthorization of the device; and moving a registration of the additional device to the available slot.

2. The method of claim 1, wherein the deauthorization parameter is a time based parameter.

3. The method of claim 2, wherein the time based parameter is a parameter selected from the group consisting of a content playback expiration parameter and an idle time device parameter.

4. The method of claim 1, wherein the deauthorization parameter is a location based parameter that is based upon the device entering or exiting a geographical location.

5. The method of claim 1, wherein the deauthorization parameter is a device based parameter.

6. The method of claim 5, wherein the device based parameter is selected from the group consisting of technology obsolescence, user customized device priority, and device security.

7. The method of claim 1, wherein the maximum quantity of available slots complies with a plurality of usage rules determined by a content provider.

8. The method of claim 7, further comprising automatically updating the maximum quantity of available slots based upon an update to the plurality of usage rules.

9. A computer program product comprising a computer readable storage device having a computer readable program stored thereon, wherein the computer readable program while executing on a computer causes the computer to:

verify, with a processor, a user account for content delivery with a rolling slot configuration, the rolling slot configuration having a maximum quantity of available slots for devices authorized to receive content, the rolling slot configuration having a plurality of ordered slots that are ordered from lowest to highest based upon priority, wherein the priority determines maintenance of the devices in the rolling slot configuration;

receive a request for content from the user account at a device;

automatically register the device in an available slot of the rolling slot configuration based upon a determination of slot availability, the available slot having a higher priority than at least a portion of a remainder of the plurality of ordered slots associated with previously assigned devices;

automatically assign the device a first priority that is based on a position of the available slot in the rolling slot configuration;

authorize the device to play content associated with a user entitlement;

automatically deauthorize the device to play the content if the maximum Quantity of available slots is filled and a deauthorization parameter is met for the device, wherein the device is deauthorized if one or more additional deauthorization parameters are met for one or more additional devices in the rolling slot configuration and the first priority has a lower priority than corresponding priorities of the one or more additional devices;

remove a registration of the device from the available slot after the deauthorization of the device; and move a registration of the additional device to the available slot.

10. The computer program product of claim 9, wherein the deauthorization parameter is a time based parameter.

11. The computer program product of claim 10, wherein the time based parameter is a parameter selected from the group consisting of a content playback expiration parameter and an idle time device parameter.

12. The computer program product of claim 9, wherein the deauthorization parameter is a location based parameter that is based upon the device entering or exiting a geographical location.

13. The computer program product of claim 9, wherein the deauthorization parameter is a device based parameter.

14. The computer program product of claim 13, wherein the device based parameter is selected from the group consisting of technology obsolescence, user customized device priority, and device security.

15. The computer program product of claim 9, wherein the maximum quantity of available slots complies with a plurality of usage rules determined by a content provider.

16. The computer program product of claim 15, further comprising automatically updating the maximum quantity of available slots based upon an update to the plurality of usage rules.

17. A system comprising:

a processor that verifies a user account for content delivery with a rolling slot configuration, receives a request for content from the user account at a device, automatically registers the device in an available slot of the rolling slot configuration based upon a determination of slot availability, authorizes the device to play content associated with a user entitlement, automatically deauthorize the device to play the content if the maximum quantity of available slots is filled and a deauthorization parameter is met for the device, automatically assigns the device a first priority that is based on a position of the available slot in the rolling slot configuration, removes a registration of the device from the available slot after the deauthorization of the device, and moves a registration of an additional device with a higher priority than the device to the available slot, the rolling slot configuration having a maximum quantity of available slots for devices authorized to receive content, the rolling slot configuration having a plurality of ordered slots that are ordered from lowest to highest based upon priority, wherein the priority determines maintenance of the devices in the rolling slot configuration, wherein the available slot has a higher priority than at least a portion of a remainder of the plurality of ordered slots associated with previously assigned devices, wherein the device is deauthorized if one or more additional deauthorization parameters are met for one or more additional devices in the rolling slot configuration and the first priority has a lower priority than corresponding priorities of the one or more additional devices.

18. The system of claim 17, wherein the deauthorization parameter is a time based parameter.

19. The system of claim 18, wherein the time based parameter is a parameter selected from the group consisting of a content playback expiration parameter and an idle time device parameter.

20. The system of claim 17, wherein the deauthorization parameter is a location based parameter that is based upon the device entering or exiting a geographical location.

\* \* \* \* \*